W. Peck.

Impd Apparatus for Cooling Milk.

No 2827 Reissued Dec. 31, 1867.

Witnesses.

A. D. James.

H. Peck

Inventor.

Watson Peck

United States Patent Office.

WATSON PECK, OF BABCOCK'S GROVE, ILLINOIS.

*Letters Patent No.* 64,028, *dated April* 23, 1867; *reissue No.* 2,827, *dated December* 31, 1867.

IMPROVED APPARATUS FOR COOLING MILK.

The Schedule referred to in these Letters Patent and making part of the same.

TO ALL WHOM IT MAY CONCERN:

Be it known that I, WATSON PECK, of Babcock's Grove, in the county of Du Page, and State of Illinois, have invented a new and useful improved Apparatus for Cooling Milk; and I do hereby declare and make known that the following is a full, clear, and exact description of the same, reference being had to the accompanying drawings, and the letters and figures of reference marked thereon, which form part of this specification.

My said invention consists in arranging a coil of pipe in a vat or other suitable reservoir for containing cold water, so that the milk to be cooled may pass through said pipe, and thus become cool as desired.

To enable those skilled in the art to understand how to construct and use my said invention, I will now proceed to describe the same with particularity, making reference in so doing to the aforesaid drawings, in which—

Similar letters of reference in the different figures denote the same parts of my said invention.

Figure 1:
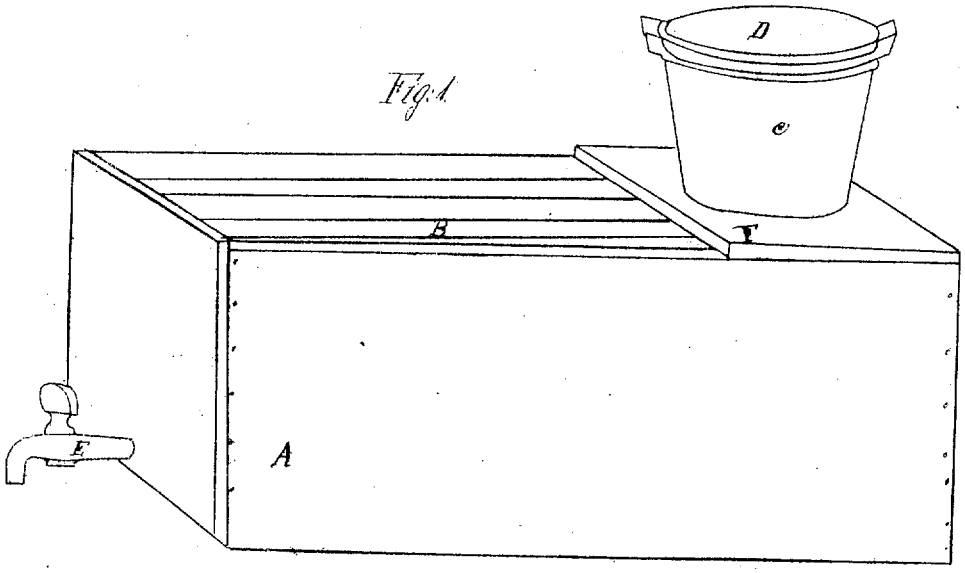
Figure 1 represents a perspective view of my invention.
Figure 2:
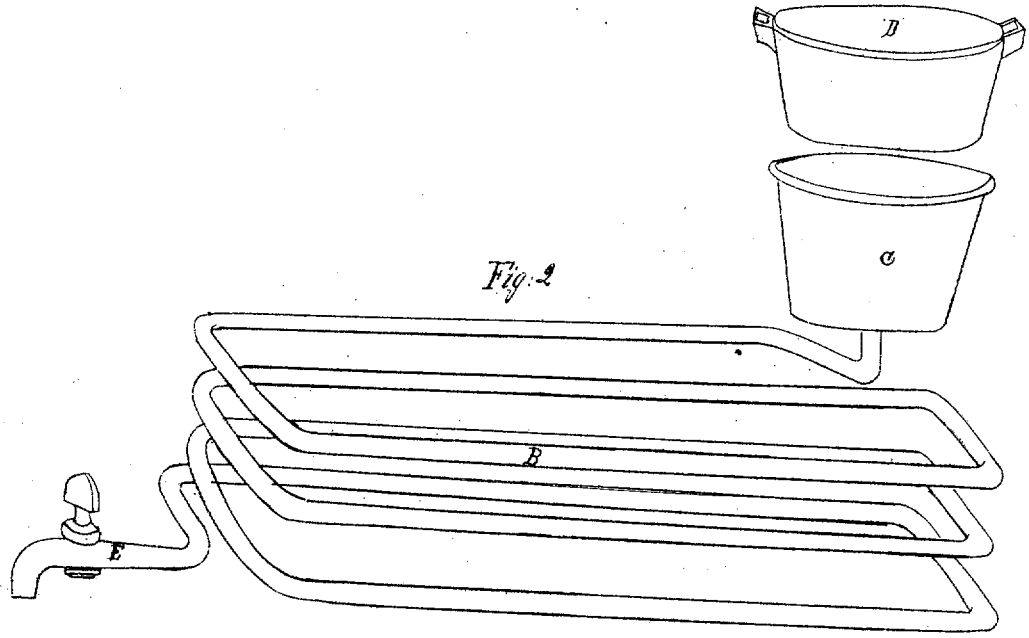
Figure 2 is a similar view of the coil and its attachments, the reservoir or vat being removed.

A represents a vat or tub, or any kind of vessel for containing water or other cold fluid, which may be constructed of any suitable material, as wood or sheet or cast metal, as may be preferred, and may be of any desired form or dimensions to adapt the apparatus to the position in which it is to be used. B represents a pipe, of lead or any other suitable material, which may be about an inch in diameter, though it may be smaller or larger, it being obvious, however, that the milk will be cooled to a given temperature by passing through a small pipe of less length than would be necessary in case a larger pipe were used. Thus it would depend upon the quantity of milk to be cooled whether a large pipe of an increased length, allowing a more rapid discharge of the milk, would be preferable, or whether a smaller pipe, of less length, might be used advantageously.

The coiled form is not essential, the only point being to get a pipe of sufficient length to cool the milk in a compact form, as it is evident that a long, trough-like water-vat containing a straight pipe of the required length, would answer the same purpose and operate upon the same principle, although it would not be so convenient.

To the upper end of said pipe is attached a vessel, C, of any suitable size and form, in which the milk is poured through a straining-vessel, D, and from which it flows into the pipe, passing through which it is drawn off through a stop-cock, E, as shown, attached to the lower end of said pipe B. The vessel or funnel C rests upon a board, F, lying across one end of the vat A, but it may be supported in any other suitable manner.

Having described the construction, operation, and nature of my invention, I will now specify what I claim, and desire to secure by Letters Patent.

I claim the combination of a pipe, B, provided with a receiver, C, or its equivalent, with a cooling-vat, A, arranged to operate substantially in the manner and for the purposes herein set forth.

WATSON PECK.

Witnesses:

CHARLES PECK,

CHAS. E. MOORE.